United States Patent Office 3,269,922
Patented August 30, 1966

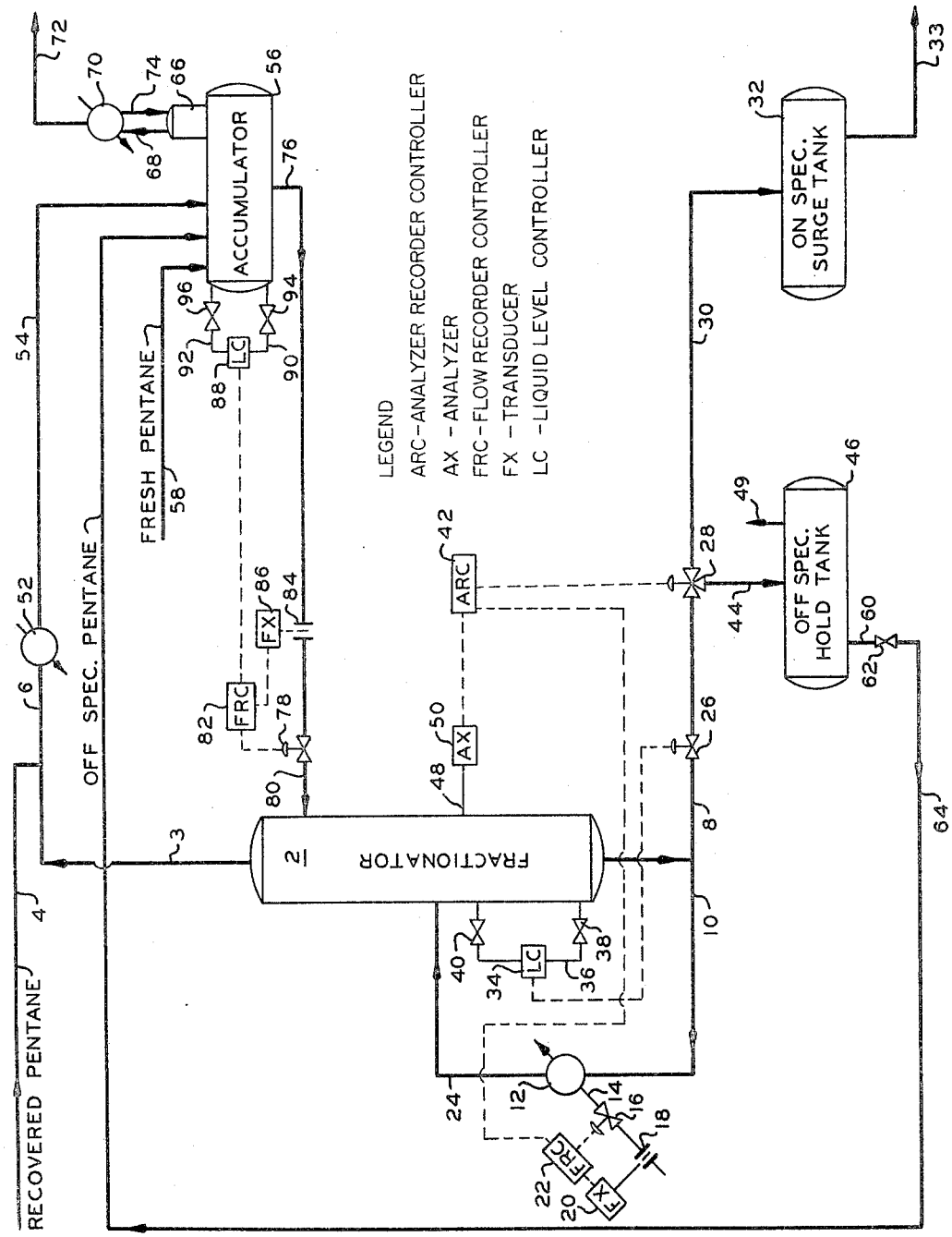

3,269,922
FRACTIONAL DISTILLATION SYSTEM WITH FLUID PRODUCT DISCHARGE CONTROL
Lowell T. Price and Jack S. Scoggin, Bartlesville, Okla., assignors to Phillips Petroleum Company, a corporation of Delaware
Filed Sept. 9, 1963, Ser. No. 307,705
2 Claims. (Cl. 203—3)

This invention relates to a fractional distillation system. In one aspect the invention relates to the control of the impurities in the product recovered from a fractional distillation system. In another aspect the invention relates to the recovery and purification of diluent used in the polmerization of 1-olefins. In yet another aspect the invention relates to the control of the concentration of butenes in pentane recovered by fractional distillation.

It is well known to catalytically polymerize 1-olefins in the presence of a hydrocarbon diluent. The polymer may be formed dissolved in the diluent or the polymer may be formed as a particulate solid. In either case, it is necessary to separate the diluent from the polymer. The diluent is then subjected to various treatments in order to remove materials from said diluent which would be poisonous to the catalyst employed for the polymerization. The diluent is then recycled to the reaction system. One of the problems associated with recovering and purifying the diluent has been the removal of inert material such as air, water and light hydrocarbons from the system without undue loss of diluent hydrocarbon. This is frequently accomplished by degassing or fractionally distilling the used diluent. One problem with this operation is to obtain a complete separation between the particular hydrocarbon employed as the diluent and closely boiling hydrocarbons. Very close tolerances are required so that the product removed from the fractional distillation system has an absolute minimum of the lighter boiling hydrocarbons therein.

It is an object of the invention to provide a novel fractional distillation system.

It is another object of the invention to provide a novel method for the control of the impurities in the effluent from the fractional distillation system.

Yet another object of the invention is to provide a novel method and apparatus for diverting off-specification product recovered from a fractional distillation system.

These and other objects of the invention will be readily apparent to those skilled in art from the accompanying disclosure, drawing and appended claims.

These objects are broadly accomplished in a process for the recovery of at least one component from a multi-component mixture by the method comprising introducing said mixture into a fractionation zone, heating said fractionation zone, withdrawing a stream containing product from said zone, recovering said product stream, determining the amount of at least one impurity in said product stream, adjusting the amount of heat applied to said zone and diverting the withdrawn stream from product flow when the amount of said impurity exceeds a predetermined value.

In one embodiment of the invention the overhead from the fractionation zone is cooled so as to condense the desired recycle component and said condensate is passed into an accumulation zone from which the recycle component is recycled to the fractionation zone. In this embodiment the diverted off-specification product stream recovered from the lower portion of the fractionation zone is introduced into said accumulation zone. Loss of recycle material is minimized by venting the accmulation zone through a cooling zone to condense the recycle material.

The drawing represents a schematic illustration of a simplified process and apparatus employing the novel concepts of the invention.

The invention is broadly applicable to the separation of at least one component from a multi-component mixture by fractional distillation. Description of the invention is simplified by reference to the separation and recovery of the hydrocarbon diluent employed in the polymerization of 1-olefins from a mixture of said diluent with the monomer employed for polymerization and hydrocarbons lighter than said diluent. For purposes of simplification the invention is described with reference to a system for the polymerization of ethylene and butene-1 with a chromium oxide catalyst as described in the patent to Hogan et al., U.S. 2,825,721 employing n-pentane as the diluent. The pentane is separated from the polymer solids by any conventional means well known to those skilled in art. The thus separated diluent, which contains equilibrium amounts of n-pentane and lighter hydrocarbons such as butene-1, air, carbon dioxide and the like, is then passed to a degassing column or fractional distillation system for the removal of these lighter boiling hydrocarbons.

Referring now to the drawing, this recovered diluent may be introduced into the fractionator 2 by any conventional means including the introduction into the overhead which is subsequently condensed and recycled. In the preferred embodiment, the recovered diluent, n-pentane, is introduced through conduit 4 into the overhead conduit 6 which contains the overhead from the fractionator 2. This overhead 3 contains substantially all the butenes and lighter hydrocarbons with the bottom containing basically n-pentane which is removed through conduit 8. Fractionator 2 contains a series of trays with the mixture contained therein being heated by an external reboiling system whereby a portion of the effluent from the fractionator 2 is removed from conduit 8 through conduit 10 and passed through a heat exchange system 12 which heats the effluent by means of steam or other heat exchange fluid passing through conduit 14. The amount of steam introduced through conduit 14 is controlled by valve 16 which is actuated by flow control means 22 responsive to a signal from flow rate sensing means 18 and transducer 20. The heated effluent is then introduced into an intermediate portion of the fractionator 2 through conduit 24.

The heating of the fractionator is controlled so as to produce substantially pure n-pentane in conduit 8. Preferably the amount of butenes in conduit 8 is 0 to 5 parts per million. If butene level in the effluent is maintained below the desired level, the effluent passes through conduit 8, valve 26, three-way valve 28 and conduit 30 into a surge tank 32 from whence the n-pentane is eventually removed through conduit 33 for recycle to the polymerization system. The amount of effluent removed is controlled by liquid level controller 34 in conduit 36 containing valves 38 and 40. Liquid level controller 34 actuates valve 26 responsive to the level of the contents in the bottom of the fractionator.

If, however, the amount of butenes in conduit 8 increases above a predetermined set value, such as 5 parts per million, valve 28 is actuated by analyzer-recorder-controller 42 so as to divert the off-specification n-pentane through conduit 44 to off-specification holding tank 46. A vent is provided in conduit 49. The amount of butenes in the effluent may be analyzed at any convenient position, one preferred position being that shown in the drawing wherein the sampling line 48 is provided in one of the lower trays of the fractionator preferably the first tray from the bottom of the tower and connected to an analyzer 50. However, the amount of butene may also be analyzed in the effluent from the fractionator in conduit 8 or in another more convenient tray so long as the value is indicative of the amount of butenes in the effluent from the bottom of the fractionator. Preferably this value is chromatographically analyzed and a signal is transmitted to analyzer-recorder-controller 42. Analyzer-recorder-controller 42 not only actuates valve 28 to divert the off-specification material to the off-specification holding tank 46 but also transmits a signal to flow recorder-controller 22 so as to reset said flow recorder-controller to adjust the amount of steam passing through valve 16 to increase the temperature of the fluid passing through conduit 24 into the fractionator. By so adjusting the temperature the amount of butenes vaporized is increased thereby decreasing the amount of butenes in the bottoms from the fractionator. This increase in applied heat is continued until the butene level has decreased to the desired level.

The overhead removed through conduits 3 and 6 contains n-pentane, butenes and lighter boiling hydrocarbons as well as normally gaseous materials such as air and carbon dioxide. These hydrocarbons and gases are passed through a cooler 52 which condenses the n-pentane. The condensate along with the accompanying vapor is passed through conduit 54 into accumulator 56. In addition, fresh n-pentane may be introduced into accumulator 56 through conduit 58 to make up for losses. Also the off-specification n-pentane may be periodically or continuously removed from the hold tank 46 and introduced through conduit 60, valve 62 and conduit 64 into the accumulator 56. The accumulator is vented through a packed tower 66 to decrease the loss of n-pentane. The rising vapors are passed through tower 66 and conduit 68 and into a cooler 70 where the temperature is controlled so as to condense the n-pentane without condensing the undesirable lighter boiling hydrocarbons which are removed through conduit 72 while the condensed n-pentane is passed back into the accumulator through conduit 74. The n-pentane is recycled back to the fractionator through conduit 76, valve 78 and conduit 80. The amount of n-pentane recycled to fractionator 2 through conduit 80 is controlled by valve 78 which is adjusted by flow recorder-controller 82 responsive to a signal from a flow sensing means 84 transmitted through transducer 86 to flow recorder-controller 82. This may be reset by level controller 88 which is in communication with accumulator 46 through conduits 90, 92 and valves 94 and 96.

In a preferred embodiment of the invention wherein the desired product is n-pentane, the fractionator 2 is preferably maintained at 80 p.s.i.a. with the top at 177° F. and the bottom at 206° F. Hold tank 46 and surge tank 32 are maintained at 206° F. and 80 p.s.i.a. The accumulation zone 56 is maintained at 105° F. and 75 p.s.i.a.

In the following flow sheet the numbers refer to the conduits and vessels in the drawing.

FLOW SHEET (POUNDS PER STREAM DAY)

| | Feed to Fractionator | | Vent Stream | Bottoms |
|---|---|---|---|---|
| Reference Numeral | 58 | 4 | 72 | 30 |
| Methane | | | 44 | 44 | |
| Ethane | | | 246 | 246 | |
| Ethylene | | | 23,210 | 23,210 | |
| Butene-1 | | | 4,415 | 4,415 | |
| Inert C$_4$'s | | | 173 | 173 | |
| n-Pentane | 44,470 | | 264,400 | 1,000 | 267,000 |
| Total | *339,958 | | | *69,958 | *267,000 |

*The differences in the total are due to losses throughout the plant.

When the fractionator has been properly adjusted the bottoms will contain less than 5 p.p.m. of butene-1 and the resultant purified n-pentane will go to product recovery. However, if for some reason the amount of butene-1 exceeds 5 p.p.m. the bottoms stream is diverted to the off-specification holding tank and the flow recorder-controller 22 is reset by ARC 42 to increase the temperature in the fractionator bottom to 208° F.

While certain examples, structures, composition and process steps have been described for purpose of illustration, the invention is not limited to these. Variation and modification within the scope of the disclosure and claims can readily be effected by those skilled in the art.

We claim:
1. A process for the recovery of pentane from a mixture containing n-pentane, butenes, lighter boiling hydrocarbons, air and carbon dioxide comprising introducing said mixture into a fractionation zone, heating said fractionation zone with a heat exchange fluid by indirect heat exchange, removing the butenes, lighter boiling hydrocarbons, air and carbon dioxide overhead from said zone along with a minor amount of n-pentane, passing said overhead through a cooling zone to condense said n-pentane without condensing the butenes, passing the resultant condensate and remaining vapors to a storage zone, removing vapors therefrom, refluxing said condensed n-pentane to said fractionation zone, withdrawing a substantially pure n-pentane fraction from a lower portion of said zone, passing said n-pentane fraction to a product recovery zone, measuring the amount of butene in said n-pentane fraction and when the amount of butene exceeds 5 weight parts per million increasing the amount of heat applied to said fractionation zone by said heat exchange fluid and diverting said n-pentane fraction from said product recovery zone, said increase of heat and diversion continuing until the butene content is lowered to said value, and recycling said diverted n-pentane fraction to said storage zone.

2. A fractional distillation system comprising, in combination, a fractionation vessel, an effluent conduit for the withdrawal of product from a lower portion of said vessel, an external reboiling conduit in communication with said effluent conduit and an intermediate portion of said fractionation vessel for heating said fractionation vessel, a heat exchange means in communication with said reboiling conduit, heating means for passing a heat exchange fluid through said heat exchange means, means for controlling the flow of said heat exchange fluid, an overhead conduit in communication with an upper portion of said fractionation vessel and an accumulation vessel exterior of said fractionation vessel, a cooling means in said overhead conduit, venting means in said accumulation vessel, a recycle conduit in communication with the lower portion of said accumulation vessel and an upper portion of said fractionation vessel, valve means in said effluent conduit, a product recovery conduit in communication with said valve means and a product recovery zone, a second recycle conduit in communication with said valve means and said accumulation vessel, a sensing means in communication with the interior of said fractionation vessel for determining the amount of impurities in said effluent conduit, a control means responsive to said sensing means adapted to actuate said valve means to divert flow from said effluent conduit to said second recycle conduit instead of said product recovery zone when the amount of said impurities increases, said control means being adapted to simultaneously control the amount of heat exchange fluid passing through said heat exchange means to increase the amount of heat applied to said fractionation vessel.

References Cited by the Examiner

UNITED STATES PATENTS

| | | | |
|---|---|---|---|
| 2,813,594 | 11/1957 | Gantt | 202—160 |
| 2,882,693 | 4/1959 | Clay | 202—160 X |
| 2,900,334 | 8/1959 | Miller | 196—132 X |
| 2,974,182 | 3/1961 | Van Pool | 202—160 X |
| 2,990,437 | 6/1961 | Berger | 202—40 X |
| 2,992,976 | 6/1961 | Cottle | 202—160 X |
| 2,994,646 | 8/1961 | Kleiss | 196—132 X |

OTHER REFERENCES

Hoffman: Hydrocarbon Processing and Petroleum Refiner; Automatic Controls for Distillation; February 1963, vol. 42, No. 2, (pp. 117 to 119).

NORMAN YUDKOFF, *Primary Examiner.*

V. W. PRETKA, J. C. JOHNSON, *Assistant Examiners.*